Patented Nov. 20, 1951

2,575,927

UNITED STATES PATENT OFFICE 2,575,927

BORON CARBIDE MATERIAL AND PROCESS OF MAKING SAME

Franz Pfeiffer, Innsbruck, Tirol, Austria, assignor to D. Swarovski Glasfabrik und Tyrolit Schleifmittel-Werke, Wattens, Tirol, Austria No Drawing. Application September 26, 1947, Serial No. 776,417. In Austria May 23, 1947

8 Claims. (Cl. 106—43)

This invention relates to a process of producing a solid solution of boron carbide, phosphorus, ferrum, carbon and its object is to avoid certain shortcomings of the conventional processes.

By the conventional processes, boron carbides of various chemical combinations have been produced. Most of them comprise an admixture of free carbon in the form of graphite, especially that carbide which answers to the formula $B_4C$, and which is practically the most important of all due to its great hardness. This applies also to those carbides which contain more boron and are less hard. As is well known these admixtures of carbon reduce the hardness and the strength of the boron carbides.

Hitherto it was indispensable to use an extremely pure carbon as starting material for producing boron carbides, such as charcoal, soot, or graphite, in order to diminish the said deficiencies. These materials, however, are too expensive for the commercial production of boron carbides, or in the case of soot, are difficult to use because of their nature. Therefore there was no other way than to put up with the contamination by free carbon, or to content oneself with producing a boron carbide containing more boron than that which answers to the formula $B_4C$, but contains less free carbon, and which is less hard, as mentioned before. Another proposal was to sift the produced boron carbide in order to separate the carbides rich in carbon from those containing less of it. That process, however, is complicated and is not satisfactory in the economical and technical view.

According to my invention a solid solution of boron carbide, phosphorus, ferrum, carbon, the boron carbide answering to the formula $B_4C$ or containing more boron, is produced which does not contain any free carbon at all, the process allowing the use of a cheap starting material for the carbon component, such as coke or petrol coke which always contain iron, thus, enabling one to produce a high quality product on a large scale and in an economical way, which, hitherto, could be produced in the laboratory only.

This object is achieved according to my invention by admixing phosphorus or compounds thereof to boric acid or boron trioxide and commercial carbon containing ferrum, the quantity of phosphorus depending on the proportion of ferrum contained in the mixture. Generally the quantity of phosphorus may amount to 0.5 up to 20% of that of ferrum, and therefore if the proportion of ferrum is 3% of the mixture, that of phosphorus amounts to 0.015 up to 0.6%. The addition of that quantity of phosphorus has no detrimental effect. It has been found that ferrum, which can always be found as an impurity in inexpensive carbon raw material such as coke, dissolves the carbon at high temperatures as already known, and eliminates it again in the form of graphite when cooled down, whereby the smelting product tends to decompose and does not become strong enough and therefore does not guarantee the obtaining of a uniform size of grain as required for grinding purposes. That detrimental effect of ferrum is prevented by adding phosphorus in the above mentioned proportions.

More precisely, the new method of producing a solid solution of boron carbide, phosphorus, ferrum, carbon, free of free elementary carbon, consists of adding red or pure phosphorus or phosphorus compounds to a mixture of a directly reducible boron compound which is carbonizable by carbon to boron carbide, such as boron trioxide or boric acid, and of an equivalent of carbon in the form of inexpensive cokes, such as petrol coke, which contain ferrum, and melting the mixture in an electric arc furnace at about 2300 to 2400° C. whereby the molten iron which is an impurity in the coke used in the process, is deprived of its capacity to dissolve carbon.

For obtaining extraordinarily tough boron carbide, pure ferrum or ferric oxide may be added to the mixture. Since formation of carbon in the liquid iron is prevented by the addition of phosphorus, separation of elementary carbon upon cooling of the boron carbide-ferrum-phosphorus-carbon solution to its solid phase, is made impossible.

The product obtained by the new process is a solid solution of boron carbide, phosphorus, ferrum, carbon of high quality, uniformity and stability, even if the solution contains more boron than that according to the formula $B_4C$.

While hitherto production of boron carbides was dependent on the use of a ferrum-free carbon, my invention permits the use of carbon of less purity such as coke or petrol coke. Thus, the economy in producing boron carbides is improved to a high degree. Moreover my invention enables one to produce extremely tough boron carbides containing more ferrum than is usually present as an impurity. For instance, the proportion of ferrum is allowed to increase up to 30%. Hitherto production of such boron carbides was not possible in a satisfactory way, the increased proportion of ferrum effecting separation of the detrimental graphite to a far greater extent than is caused by the ferrum forming impurities of commercial carbon such as coke.

Producing a tough carbide comprising boron carbide of the formula $B_4C$.

Example 50 kg. of boron trioxide or 88.7 kg. of boric acid are melted in an electric arc furnace together with 38 kg. of coke containing 0.9 kg. of ferric oxide as impurities, 2.6 kg. of pure ferric oxide and 0.18 kg. of red phosphorus until the reduction of the oxygenous compounds by carbon is accomplished. The solidified resulting mixture is formed of 19.7 kg. of boron carbide of the formula $B_4C$ and about 2.75 kg. of a solid solution of ferrum phosphorus-carbon.

The proportion of the added phosphorus may vary in accordance with the other pecularities of the components of the mixture. The most advantageous proportion of phosphorus to be added may be readily determined by testing in every individual case.

The amount of phosphorus may be varied within relatively wide limits, as the conditions for determining the amount to be added frequently are difficult to ascertain. These conditions relate for example to the proportion of ferrum in the mixture according to the amount of impurities, or to the varying pecularities of the phosphorus or its compounds. Furthermore, the manner of addition of the phosphorus would have an influence. For instance, this is the case if the phosphorus evaporates prior to forming a stable compound.

I claim:

1. The process of making an extraordinarily tough solid solution of boron carbide, phosphorous, ferrum, carbon, free of free elementary carbon, comprising melting a mixture of boric acid, of an equivalent amount of carbon, ferric oxide, and of pure phosphorus amounting to 0.5 to 20 per cent of the total amount of ferrum in the mixture, the ferrum content of the finished product amounting to not more than 30 per cent of the product.

2. As a product of manufacture, a solid solution comprising between 85% and 90% by weight boron carbide conforming substantially with the formula $B_4C$ and between 15% and 10% by weight solid solution of phosphorus-ferrum-carbon.

3. The process of making a boron carbide material, free of free elementary carbon and consisting substantially of boron carbide dispersed in a solid solution of phosphorus, ferrum, and carbon, comprising melting a mixture of boric acid, of an equivalent amount of carbon containing ferrum as an impurity, and of phosphorus amounting to between 0.5% and 20% of the ferrum in the melt, heating until reduction of the oxygenous compounds by carbon is completed, and thereafter cooling the resulting boron carbide-ferrum-phosphorus-carbon melt to its solid phase.

4. The process of making a boron carbide material, free of free elementary carbon and consisting substantially of boron carbide dispersed in a solid solution of phosphorus, ferrum, and carbon, comprising melting a mixture of boric acid, of an equivalent amount of carbon containing ferrum as an impurity, and of red phosphorus amounting to between 0.5% and 20% of the ferrum in the melt, heating until reduction of the oxygenous compounds by carbon is completed, and thereafter cooling the resulting boron carbide-ferrum-phosphorus-carbon melt to its solid phase.

5. The process of making a boron carbide material, free of free elementary carbon and consisting substantially of boron carbide dispersed in a solid solution of phosphorus, ferrum, and carbon, comprising melting a mixture of boric acid, of an equivalent amount of carbon containing ferrum as an impurity, of ferrum, and of phosphorus amounting to between 0.5% and 20% of the ferrum in the melt, heating until reduction of the oxygenous compounds by carbon is completed, and thereafter cooling the resulting boron carbide-ferrum-phosphorus-carbon melt to its solid phase.

6. The process of making a boron carbide material, free of free elementary carbon and consisting substantially of boron carbide dispersed in a solid solution of phosphorus, ferrum, and carbon, comprising melting a mixture of boric acid, of an equivalent amount of carbon containing ferrum as an impurity, of ferric oxide, and of phosphorus amounting to between 0.5% and 20% of the ferrum in the melt, heating until reduction of the oxygenous compounds by carbon is completed, and thereafter cooling the resulting boron carbide-ferrum-phosphorus-carbon melt to its solid phase.

7. The process of making a boron carbide material, free of free elementary carbon and consisting substantially of boron carbide dispersed in a solid solution of phosphorus, ferrum, and carbon, comprising melting a mixture of boric acid, of an equivalent amount of carbon containing ferrum as an impurity, of ferric oxide, and of red phosphorus amounting to between 0.5% and 20% of the ferrum in the melt, heating until reduction of the oxygenous compounds by carbon is completed, and thereafter cooling the resulting boron carbide-ferrum-phosphorus-carbon melt to its solid phase.

8. The process of making a boron carbide material, free of free elementary carbon and consisting substantially of boron carbide dispersed in a solid solution of phosphorus, ferrum, and carbon, comprising melting a mixture of boric acid, of an equivalent amount of carbon containing ferrum as an impurity, of pure ferrum, and of red phosphorus amounting to between 0.5% and 20% of the ferrum in the melt, heating until reduction of the oxygenous compounds by carbon is completed, and thereafter cooling the boron carbide-ferrum-phosphorus-carbon melt to its solid phase.

FRANZ PFEIFFER.

REFERENCES CITED

The following references are of record in the file of this patent:

UNITED STATES PATENTS

| Number | Name | Date |
|---|---|---|
| 966,399 | Higgins | Aug. 2, 1910 |
| 1,897,214 | Ridgway | Feb. 14, 1933 |
| 1,925,396 | Masin | Sept. 5, 1933 |
| 2,005,956 | Ridgway | June 25, 1935 |
| 2,136,107 | Kirchner et al. | Nov. 8, 1938 |
| 2,149,939 | Kinzie et al. | Mar. 7, 1939 |
| 2,158,520 | Meyer | May 16, 1939 |
| 2,364,123 | Benner et al. | Dec. 5, 1944 |